United States Patent [19]

Duggan

[11] 4,118,754

[45] Oct. 3, 1978

[54] ELECTRICAL PANEL HAVING MOLDED BASE PAN

[75] Inventor: J. E. Duggan, Atlanta, Ga.

[73] Assignee: Gould Inc., Rolling Meadows, Ill.

[21] Appl. No.: 772,442

[22] Filed: Feb. 28, 1977

[51] Int. Cl.² .................................................. H02B 1/20
[52] U.S. Cl. ................................. 361/355; 339/198 N
[58] Field of Search ............... 361/346, 353, 354, 355, 361/358, 361, 363; 339/198 N

[56] References Cited

U.S. PATENT DOCUMENTS

| | | | |
|---|---|---|---|
| 2,934,660 | 4/1960 | Brunner | 361/355 |
| 2,980,824 | 4/1961 | Kobryner | 361/346 |
| 3,418,536 | 12/1968 | Jacobs | 361/353 |
| 3,463,967 | 8/1969 | Klein | 361/353 |

Primary Examiner—Gerald P. Tolin
Attorney, Agent, or Firm—Ostrolenk, Faber, Gerb & Soffen

[57] ABSTRACT

This invention relates to an electrical panel assembly for the mounting of circuit breakers in which a single molded insulating member is provided with formations that position and in some cases retain the electrical elements. The insulating member is also provided with integrally formed hook formations for mechanical retention of the circuit breakers.

10 Claims, 7 Drawing Figures

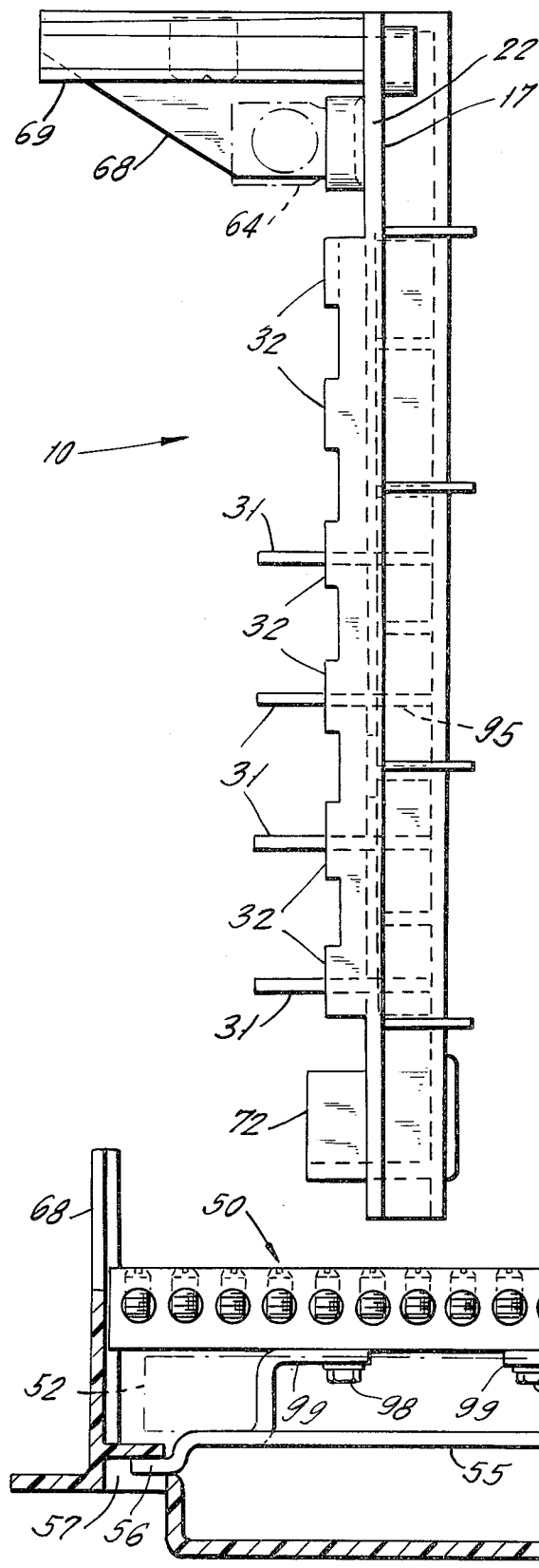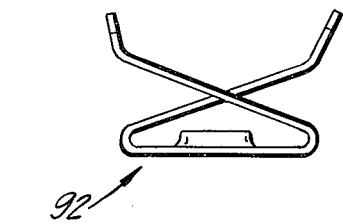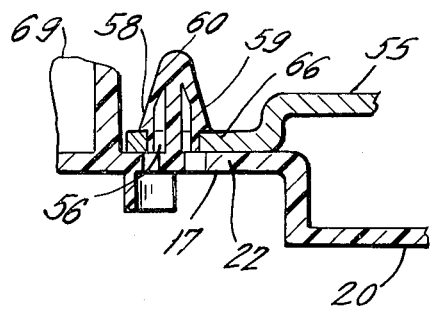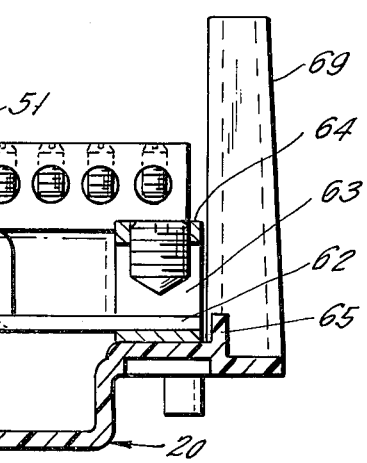

ELECTRICAL PANEL HAVING MOLDED BASE PAN

This invention relates to electrical panels for circuit breakers in general and more particularly relates to a panel of this type provided with a molded insulating pan or base.

Conventionally, electrical panels for circuit breakers are constructed of a metal base so that it is necessary to take special precautions in order to insulate the electrical elements from the base. In particular, either insulating sheets or insulator standoffs must be interposed between the bus bars and the metal base and precautions must be taken to insure that the metal fasteners do not provide short circuits between any of the conductors and the base.

In accordance with the instant invention a molded insulating base or pan is provided with integral formations that operatively position all of the electrical elements including a pair of main buses and a neutral bus. These integral formations also provide means for retaining the lugs or wire grips for making electrical connections to the main circuit external panel. A snap retainer integral with the base is used for securing the neutral bus and posts projecting forward from the base through apertures in the bus bars are engaged by so-called push nuts to retain the main bus bars.

Also integrally formed with the base are mounting ledges having hook formations that mechanically position and secure circuit breakers mounted to the panel. Further, the base includes integral formations defining wireways that do interfere with making of connections to the neutral bus.

Accordingly, a primary object of the instant invention is to provide a novel electrical panel that is economical to produce.

Another object is to provide a panel of this type having a molded insulating base with integral formations for positioning and/or securing all of the bus bars and circuit breakers.

Still another object is to provide a panel of this type having a reduced number of individual parts.

These objects as well as other objects of this invention shall become readily apparent after reading the following description of the accompanying drawings in which:

FIG. 3 is a side elevation of the panel looking in the direction of arrows 3—3 of FIG. 1.

FIG. 4 is an elevation looking in the direction of arrows 4—4 of FIG. 1 showing the mounting of the neutral bus.

FIG. 5 is a cross section looking in the direction of arrows 5—5 of FIG. 1 showing the snap retainer for the neutral bus.

FIG. 6 is a side elevation of one of the push nuts for securing the main bus bars.

FIG. 7 is a side elevation of one of the spring clips that retain the panel within the enclosure of FIG. 1.

Figure 1:
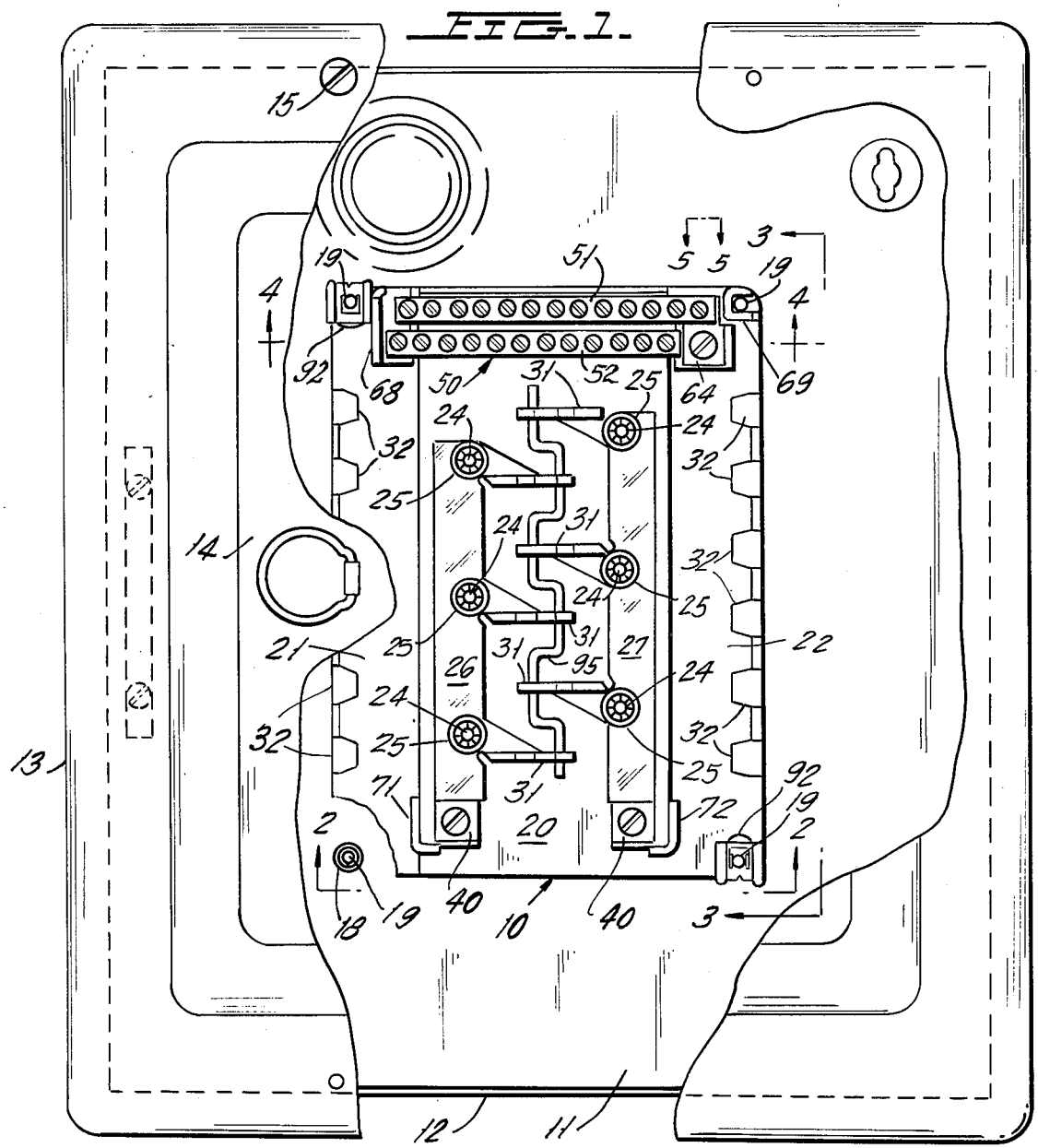
FIG. 1 is a front elevation of an electrical panel constructed in accordance with teachings of the instant invention, with the panel shown mounted in an enclosure.
Figure 2:
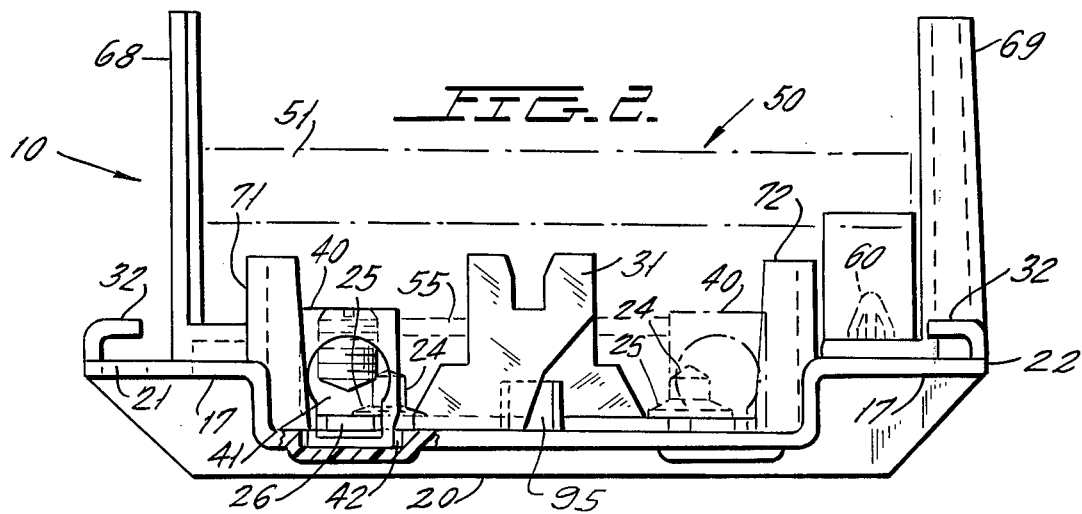
FIG. 2 is an end view of the panel looking in the direction of arrows 2—2 of FIG. 1.

Now referring to the Figures. Electrical panel 10 is shown in FIG. 1 as being secured to rear wall 11 of box-like enclosure 12. Face-plate 13, having openable cover 14, is secured by a plurality of screws 15 at the front of enclosure 12. Panel 10 includes molded insulating base 20 having apertures in the four corners thereof which receive individual posts 19 secured to enclosure rear wall 11 and extending forward therefrom. Compression springs 18 coiled around each post 19 bear against wall 11 and the rear surfaces 17 of the forwardly offset ledges 21 and 22 along the longer edges of base 20 to bias base 20 forward. Spring clips 92 (FIG. 7), positioned at diagonally opposite corners of base 20, frictionally engage posts 19 at these corners to limit forward movement of panel 10.

Formed integrally with base 20 are six forwardly extending posts 24 arranged in two rows parallel to the long edges of base 20. Posts 24 extend through individual apertures in main bus bars 26, 27 and receive push nuts 25 (FIG. 6). The latter frictionally engage posts 24 and rest against the forward surfaces of main bus bars 26, 27 to retain the latter in their operative positions against the forward surface of base 20. Extending forward from each of the main bus bars 26, 27 and positioned in spaced planes perpendicular to the plane of bus bars 26, 27, are a plurality of male line stabs 31 that are frictionally engageable by female line terminals of so-called plug-in circuit breakers having their load ends mechanically engaged and retained by hook formations 32. The latter are integrally formed with base 20 and are positioned along the long edges of base 20 extending inward thereof and positioned forward of ledges 21, 22. The end of each main bus 26, 27 is of reduced cross section and extends into opening 41 of an individual main lug, consisting of an individual screw-type wire grip terminal 40, to prevent the latter from moving forward out of shallow rectangular recess 42 in base 20.

Neutral bus assembly 50 consists of two hollow bus bars each having a plurality of screw-type wire grips. Bus bars 51, 52 are secured to formed neutral bus 55 with bar 51 being secured to half-width forward offsets 99 by screws 98 so as to be positioned forward and offset from bar 52. One end of neutral bus 55 is provided with full-width rearward offset 56 that extends into recess 57 of base 20 and the other end of neutral bus 55 is provided with half-width rearward offset 66 having aperture 56 (FIG. 5) through which snap retainer 60 extends. The latter is formed integrally with base 20 and includes a pair of fingers 58, 59 which are self-biased outwardly to normally block dismounting of neutral assembly 50 from base 20. Half-width portion 62 of neutral bus 55, at the end thereof having aperture 56, extends into aperture 63 of screw-type wire grip terminal 64 to prevent forward movement of the latter. Base formation 65 prevents terminal 64 from moving to the right with respect to FIG. 4 and movement of wire grip 64 to the left is prevented by engagement with a portion of neutral bus 55 in the region of offset 66 (FIG. 5).

Also integrally formed with base 20 and positioned at one end thereof are forwardly extending posts 68, 69 which serve to define wireways.

Forwardly extending formations 71, 72 at the other end of base 20 and integral therewith partially isolate hot terminals 40, 40. Base 20 is also provided with integral zig-zag barrier formation 95 positioned between main buses 26, 27 and extending behind portions of stabs 31 to extend creepage distances.

Thus, there has been described an electrical panel having a novel molded insulating base which reduces the number of elements required to construct the panel and also simplifies assembly thereof. Push nuts 25 for securing main buses 26, 27 may be eliminated in which event posts 24 will be shortened with the free ends thereof being enlarged or peened by applying ultrasonic energy to posts 24 after bus bars 26, 27 are positioned by posts 24. A suitable material for the molding of base 20 is NORYL SE-1 manufactured by the General Electric Company.

Although the present invention has been described in connection with a number of preferred embodiments thereof, many variations and modifications will now become apparent to those skilled in the art. It is preferred, therefore, that the present invention be limited not by the specific disclosure herein, but only by the appended claims.

What is claimed is:

1. An electrical panel assembly including a single member defining an insulating base; first and second main buses supported on said base in front thereof on a first set of formations formed integrally with said base; circuit breaker engageable stab means extending from said buses and disposed in general alignment between said buses and in front of said base; a second set of formations formed integrally with said base for mechanically holding circuit breakers in engagement with said stab means; a neutral bus supported on said base in front thereof on a third set of formations formed integrally with said base.

2. An electrical panel assembly as set forth in claim 1 in which the second set of formations includes a plurality of hooks for engaging individual circuit breakers.

3. An electrical panel assembly as set forth in claim 1 in which the first set of formations includes a plurality of forwardly extending posts projecting through apertures in said main buses.

4. An electrical panel assembly as set forth in claim 3 also including push nut means on said posts for operatively retaining said main buses.

5. An electrical panel assembly as set forth in claim 1 in which the third set of formations includes snap retainer means in operative engagement with said neutral bus.

6. An electrical panel assembly as set forth in claim 5 in which the third set of formations also defines a recess means wherein there is disposed an offset portion at one end of the neutral bus; said snap retainer engaging the neutral bus in the vicinity of its other end.

7. An electrical panel assembly as set forth in claim 1 also including first and second main lugs disposed within first and second front recesses of said base and being retained therein solely by the respective first and second main buses.

8. An electrical panel assembly as set forth in claim 7 also including a neutral lug mounted to said neutral bus and retained by a blocking formation formed integrally with the base.

9. An electrical panel assembly as set forth in claim 1 also including insulating barrier formed integrally with said base on the front thereof; said barrier means being disposed between said main buses in the region of said stab means.

10. An electrical panel assembly as set forth in claim 3 in which the second set of formations includes a plurality of hooks for engaging individual circuit breakers; said third set of formations including snap retainer means in operative engagement with said neutral bus; first and second main lugs disposed within first and second front recesses of said base and being retained therein solely by the respective first and second main buses; and insulating barrier formed integrally with said base on the front thereof; said barrier means being disposed between said main buses in the region of said stab means.

* * * * *